Patented Aug. 30, 1932

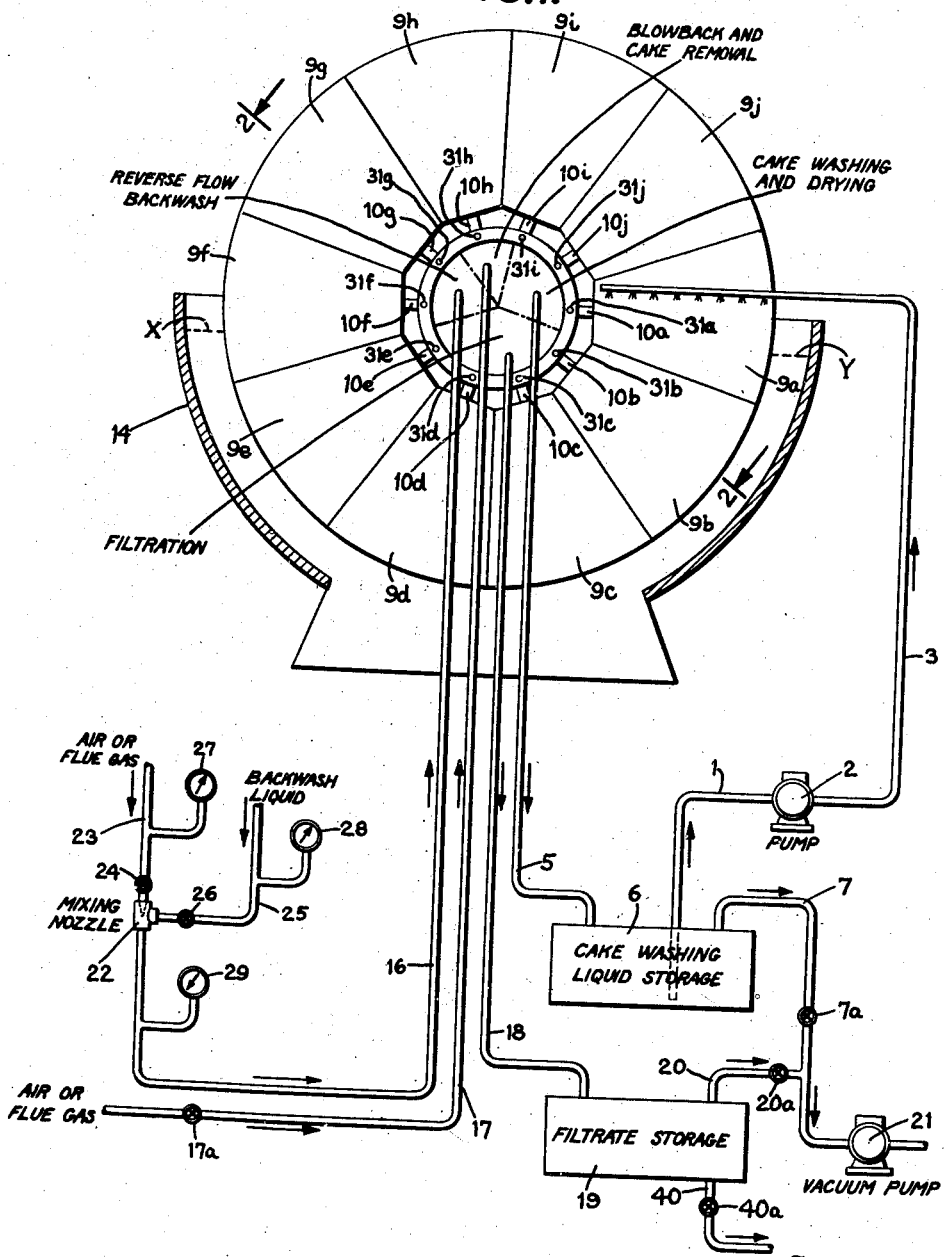

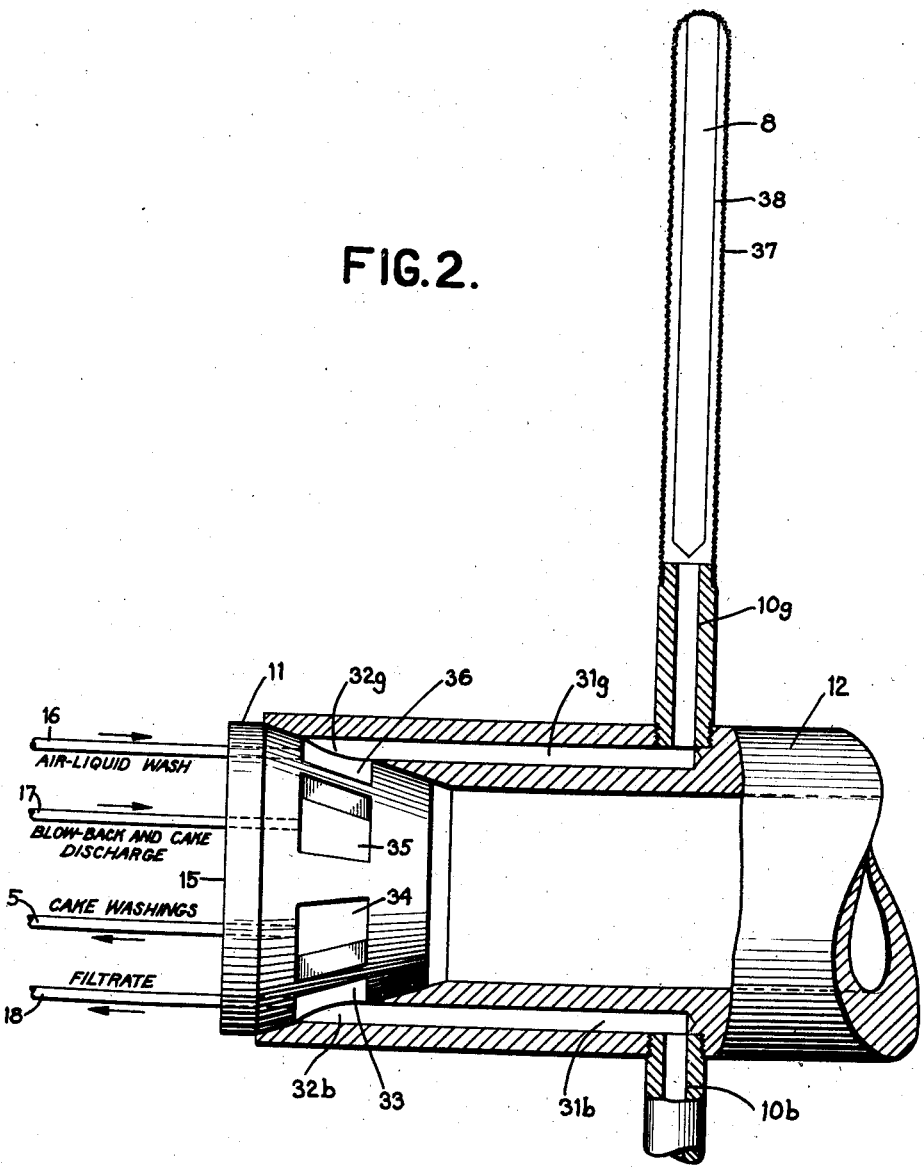

1,874,972

UNITED STATES PATENT OFFICE

FRANK W. HALL, OF PORT ARTHUR, TEXAS, ASSIGNOR TO THE TEXAS COMPANY, OF NEW YORK, N. Y., A CORPORATION OF DELAWARE

PROCESS AND APPARATUS FOR CONTINUOUS FILTRATION

Application filed November 4, 1929. Serial No. 404,534.

This invention relates to improvements in process of and apparatus for the continuous filtration of solid materials from liquids or for the continuous filtration of solids from liquids in the presence of comminuted filter-aid material and may be particularly adapted to the filtration of petroleum oils such as the filtration of suspended wax constituents from hydrocarbon oil.

In its general application the invention comprises a process of and apparatus for continuous filtration wherein one or more filtering elements, which in the preferred embodiment briefly consists of rotating discs divided into a plurality of sector-like sections, the flat sides of which are covered with a suitable fabric, each section having a separate conduit all of which terminate in a multi-chambered core or shaft, each conduit's termination forming means of attaching a disc section to said shaft. The sections are passed by rotation through successive zones of filtration, cake washing and drying, cake removal, reverse flow washing of the substantially cake free filtering surface and so on in cyclic repetition of the steps in this order.

During passage of the sections of the filtering elements through the filtration zone liquid is drawn through the surfaces leaving solid deposits thereon in the form of a cake. As each section is passed through the cake washing and drying zone where suction is still taken on the elements, the outer surface of the cake is sprayed with a suitable solvent or washing fluid which dissolves or displaces particles of filtrate remaining on the surface of, or in, the cake and which may be, for the most part, drawn through the cake by the continuing suction taken on the filtering elements during an appropriate interval of time. As the different sections of the filtering elements are passed through the zone of cake removal a blow-back or back pressure is applied through the individual conduits to the inside of the filtering surfaces which tends to distend or inflate the fabric and dislodge the cake from the opposite side thereof and while applying this back pressure the cake is removed. Following the cake removal step the sections whose surfaces are relatively clean are passed through the reverse flow washing zone where an appropriate solvent or washing fluid, which may be a portion of the filtrate if desired, is delivered under pressure and preferably in the form of a spray or mist to the inside of the filtering surfaces to thoroughly cleanse and wash the said surfaces.

Thus a foremost object of this invention is to carry on a continuous filtering process in which a desirable material is properly filtered at the highest rate attainable.

Another object of the invention is to effectively cleanse the filtering surfaces repeatedly without ceasing operation.

Still another object of the invention is to provide suitable means for carrying on the process.

The foregoing objects of the invention, together with others which will be apparent, may be better understood from the following description taken in connection with the drawings illustrating a preferred apparatus for practicing the present process in which:

Figure 1 is a view in cross section through a filter showing a filtering element in full elevation and the piping, pumps, etc. diagrammatically.

Figure 2 is a fragmentary view of the hollow shaft and a filtering element taken on the section 2—2 of Figure 1 showing the valve in full and its functional relationship to the various sections of the filtering elements.

As shown in Figure 1, one or more disc-like filtering elements or leaves 8, composed of a number of sector-like sections 9a, 9b, etc., are mounted on a hollow shaft 12. The hollow shaft 12 with the attached elements 8 is caused to rotate in a counterclockwise direction, by suitable means not shown, so that the sections composing the filtering elements are thereby passed through a bowl 14 in which an admixture of liquid and solids to be filtered is maintained, preferably at the level indicated by X and Y, the supply pipe for and source of which are not shown.

The sections 9a, 9b, etc., consisting of suitable frames are covered with suitable filter fabric, according to conventional methods of construction. Each section of the filtering elements is connected separately by means of a conduit 10a, or 10b, etc., to corresponding conduits 31a, 31b, etc., in the wall of the hollow shaft 12 and in operation functions entirely independent of the remaining sections.

The filter valve 11, which will be fully described later herein when discussing the parts illustrated in Figure 2, is centrally located at one end of the hollow shaft 12. By means of this valve each section of the filtering elements, when rotated, is successively connected with a filtrate storage tank 19 through a pipe 18, a cake washing liquid tank 6 through a pipe 5, a source of air or flue gas supply (not shown) through pipe 17 having a valve 17a, and with means for supplying a spray or mist reverse flow or backwash fluid, which will be fully described presently, through a pipe 16.

A suction line 1 from the tank 6 to a pump 2 and a discharge line 3 from the pump 2 to a suitable spray 4 serves to conduct washing liquid from storage and delivers it to the surface of the cake when the filtering sections are passed through the cake washing and drying zone.

A vacuum pump 21 serves to maintain the pressure in tanks 6 and 7 below atmospheric, while the filter is being operated, and accordingly filtrate is drawn through the filtering elements as the sections are passed through the filtering zones, and is conducted through the pipe 18 into the tank 19, while the washing liquid plus dislodged or dissolved particles of filtrate and air or gas is drawn through the filter element as the sections are passed through the cake washing and drying zone and conducted through the pipe 5a to the tank 6.

More complete extraction of the remaining particles of liquid is effected by continuing to exert vacuum on each particular section for a short time after the adhering cake has passed beyond the range of the washing sprays.

Since the washing liquid passing through the cake contains some filtrate liquid and since a large amount of air or gas is also drawn through the cake during this washing the additional storage tank 6 is provided. Separate storage tanks thus avoid unnecessary dilution of the bulk of the filtrate with washing liquid as well as avoid interference in constantly maintaining the maximum desired vacuum on the tank 19 and on the interior of each section of the filter disc during its submergence in the filtering mixture.

Since it may be unnecessary to maintain the maximum vacuum on the interior of each section during its passage through the cake washing and drying zone, valves 7a and 20a may be adjusted to maintain a differential in vacuum between tank 19 and tank 6 so that the flow of air or gas through the cake on the surface of any one section after emerging from the filtering mixture does not cause appreciable variation in the vacuum being maintained on tank 19.

The means for supplying the spray reverse flow or backwash comprises an air or flue gas supply line 23 from a source (not shown), provided with a valve 24 leading to one inlet connection of a mixing nozzle 22, and a backwash liquid supply line 25 (from a source not shown), provided with a valve 26 leading to the other inlet connection of the nozzle 22 which has an outlet pipe 16 as previously mentioned. Suitable pressure gauges 27, 28 and 29 are provided in the lines 23, 25, and 16, as shown.

Referring now to Figure 2, the tapering stationary filter valve 11 is seated in an end of the shaft 12. Within the filter valve 11 are four separate ports 33, 34, 35, and 36. The spread of these ports is illustrated by the sector-type areas labeled "filtration", "cake washing and drying", "blow back and cake removal" and "reverse flow back wash", in Figure 1, and in the circle which they form occupy approximately 160°, 90°, 40°, and 40° thereof, respectively, the remaining 30° of the circle being occupied by the walls or partitions between the ports.

The port 33 is directly connected with the filtrate tank 19 through the pipe 18; the port 34 is directly connected to the cake wash liquid tank 6 through the pipe 5; the port 35 is directly connected to a source of supply of low pressure gas or air (not shown) by means of the pipe 17; and the port 36 is directly connected to the system for supplying the solvent or spray as a reverse flow wash through the pipe 16.

During the counterclockwise rotation of the shaft 12 the ports 32a, 32b, etc., formed at the ends of the conduits 31a, 31b, etc., by the tapering seat in the end of the shaft 12 for the valve 11, register successively with the filter valve ports 33, 34, 35 and 36 for appropriate intervals of time to provide the proper conditions of vacuum filtration, cake washing, cake discharge, and reverse flow or backwash to the individual sections 9a, 9b, etc., of the filtering disc 8 in accordance with the position of each section in the cycle.

In certain filtering operations such as the dewaxing of hydrocarbon oils it is preferable to omit the step of washing the cake by application of a wash liquid in the form of a spray against the outer surface thereof. The exertion of vacuum is continued, however, throughout what corresponds to the whole period of this washing zone thereby drying the cake and removing the small amount of filtrate that might otherwise remain therein.

In a preferred embodiment of the invention particularly adapted to the dewaxing of a hydrocarbon oil, the wax-bearing oil, preferably cut back or diluted with a suitable solvent which may be petroleum naphtha, having admixed therewith a comminuted filter-aid material, is chilled to the proper temperature and continuously fed into the bowl 14 by means not shown, and maintained at sufficient depth in the bowl, as indicated by the dotted lines at X and Y so that the filter sections 9a, 9b, etc., are submerged as they rotate through the bowl 14.

As each individual section 9a, 9b, etc., is submerged in the admixture of oil, wax and filter-aid material contained within the bowl 14 the corresponding ports 32a, 32b, etc., in the tapered valve seat of the hollow shaft 12 register with the port 33 of the filter valve 11 through which the particular section of the filter disc 8 is directly connected through the pipe 18 to the filtrate storage tank 19 which is maintained under vacuum by means of the vacuum pump 21 as previously discussed. In response to the vacuum thereby exerted on the inner side of the filter section the liquid is drawn through the filter fabric leaving the solid materials deposited upon the outer surface thereof. The port 33 in the stationary valve 11 will embrace as many as five of the ports 32a, 32b, etc. in the shaft 12, due to its spread as previously explained, throughout approximately 160° of the 360° cycle.

As a section of the filtering element, e. g. 10a, is moved out of the body of the filtering mixture the corresponding port 32a leaves the port 33 and begins to register with the port 34 which has a spread of approximately 90° of the 360° cycle. During this period vacuum is still exerted, preferably to a lesser degree than that in the period in which the port 32a registers with the port 33, on the inner side of the filtering surface of section 10a thereby tending to remove the last traces of filtrate remaining in the conglomerate of waxy constituents and filter-aid materials comprising the built up cake on the outer surface of the filter element.

Upon further rotation of the shaft 12 the filter sections carrying the vacuum dried cake are moved into the zone of cake discharge throughout which zone the ports 32a, 32b, etc., register with the port 35 which has a spread of approximately 40° wherein a blast of relatively low pressure air or flue gas is applied to the inner side of the filter sections. In this way the filter fabric is caused to bulge outwards, loosening or dislodging the cake to facilitate its removal by scrapers or other suitable means, not shown in the drawings, whereby the cake is prevented from falling back into the filter bowl 14 and may be delivered to a bin or other receptacle. As has been previously discussed the substantially dry cake contains waxy constituents and is preferably removed and conveyed away from the filter to a recovery system where the waxy constituents are separated from the filter-aid material and recovered and the filter-aid material is conditioned for reuse in further dewaxing and filtering operations.

As the rotation of the shaft 12 is continued the filter sections are passed out of the zone of discharge and are brought into the filter fabric washing zone comprising the remaining 40°, approximately, of the 360° cycle. Throughout the reverse flow filter fabric washing zone the ports 32a, 32b, etc., register with the port 36 thereby forming a passage through which the solvent backwash fluid, preferably a portion of the filtrate oil itself in the form of a spray, is introduced to the interior of the filter section, and forced through the filter fabric in a reverse direction to that followed by the filtrate in the zone of filtration. Leaving this reverse flow washing zone the filter sections are again passed into the filtering portion of the cycle and the foregoing steps are cyclically repeated in the same order.

Thus by washing the filter fabric in the manner above described a high rate of filtration is maintained and the necessity for frequent shut-downs for cleaning is avoided thereby greatly increasing the operating time.

Reverse flow washing the fabric with filtrate oil after the cake has been completely removed therefrom rather than during the step of actually removing the cake avoids the possibility of a portion of said filtrate oil, which has penerated the fabric, again mixing with the cake being discharged and therefore resulting in a loss of valuable dewaxed oil in the cake being removed from the system.

It is preferable to apply the backwash or solvent oil in the form of a spray or suspension in a gas since under these conditions penetration of the fabric by the filtrate oil or other solvent wash in a direction reverse to that at which the filtrate flowed through it in the filtration zone may be more effectively accomplished.

That portion of the filtrate oil used as a reverse flow wash for the filter fabric and which actually penetrates the filter fabric trickles down into the bowl of the filter where it commingles with the admixture of suspended wax, filter-aid material and unfiltered oil which has been diluted with naphtha or other suitable solvent preparatory to filtration. Thus by employing the filtrate oil rather than naphtha or some other solvent as a wash liquid, the further undesirable dilution of the filtering mixture can be avoided. While the filtrate oil itself is preferred as a wash, the employment of a naphtha or other solvent wash is not precluded and can be taken advantage of without undue dilution of the filtering mixture since washing of the filtering surface is effected with a minimum volume of liquid when such washing is performed after the cake has been discharged as practiced in this invention.

Many modifications and variations of the

What I claim is:

1. A process of dewaxing hydrocarbon oils which comprises continuously charging a mixture of oil, precipitated wax and comminuted filter aid material to a filtering zone wherein a plurality of revolving filtering surfaces pass alternately through zones of positive pressure filtration and cake drying and reverse pressure cake discharge and filter surface washing, depositing solids in the form of a compact cake on the one side of the filtering surfaces while in the zone of positive pressure filtration, continuing to apply positive pressure while in the drying zone to remove traces of oil from the cake, applying a back pressure of an incondensable gas to the reverse side of the filtering surfaces while in the cake discharge zone to loosen the cake, removing the dislodged cake, continuing to apply said gaseous back pressure uniformly over the entire reverse side of the filtering surfaces after removal of the filter cake therefrom and during passage through the filter surface washing zone and simultaneously spraying petroleum naphtha in the form of a finely separated mist against the reverse side of the filtering surfaces into which it is forced by the gas to remove waxy constituents from the pores to produce substantially clean filter surfaces prior to the entrance of said surfaces to the zone of positive pressure filtration, and collecting a dewaxed oil from the system.

2. A process of dewaxing hydrocarbon oils which comprises continuously charging a mixture of oil, precipitated wax and comminuted filter aid material to a filtering zone wherein a plurality of revolving filtering surfaces pass alternately through zones of positive pressure filtration and cake drying and reverse pressure cake discharge and filter surface washing, depositing solids in the form of a compact cake on the one side of the filtering surfaces while in the zone of positive pressure filtration, continuing to apply positive pressure while in the drying zone to remove traces of oil from the cake, applying a back pressure of an incondensable gas to the reverse side of the filtering surfaces while in the cake discharge zone to loosen the cake, removing the dislodged cake, continuing to apply said gaseous back pressure uniformly over the entire reverse side of the filtering surfaces after removal of the filter cake therefrom and during passage through the filter surface washing zone and simultaneously spraying a portion of filtered dewaxed oil in the form of a finely separated mist against the reverse side of the filtering surfaces into which it is forced by the gas to remove waxy constituents from the pores to produce substantially clean filter surfaces prior to the entrance of said surfaces to the zone of positive pressure filtration, and collecting a dewaxed oil from the system.

3. A process of separating waxy constituents from hydrocarbon oils which comprises maintaining a body of chilled hydrocarbon oil and precipitated wax in a filtering zone, revolving through said body a series of partially immerged disc members, each containing a plurality of bag-like filtering surfaces, passing said filtering surfaces during each revolution successively through zones of filtration, cake drying, cake discharge and reverse flow washing of the filter fabric, applying a vacuum to the interior of said filtering surfaces when entering the zone of filtration whereby the waxy constituents are deposited upon the exterior of said surfaces in the form of a compact filter cake and a dewaxed oil is passed to the interior thereof, continuing to apply vacuum to the interior of said surfaces while in the cake drying zone to remove traces of oil and dry the cake, releasing the vacuum as the filtering surfaces enter the zone of cake discharge and applying a back pressure of an incondensable gas to the interior thereof to loosen the cake, removing the dislodged cake, passing the filtering surfaces through a reverse flow washing zone after removal of the cake while continuing to apply said gaseous back pressure uniformly over the whole interior thereof during passage through said washing zone and simultaneously spraying an oil solvent in the form of a mist into said gas to force said mist against the interior of the filtering surfaces to dissolve waxy constituents from the pores and produce substantially clean filtering surfaces prior to the entrance of said filtering surfaces to the zone of filtration, and collecting a dewaxed oil from the system.

4. In a rotary suction filter for separating solids from liquids, a plurality of filter elements radially mounted around a central shaft, said shaft being provided with conduits communicating with said filter elements, a valve containing suitable ports centered at one end of said shaft, a filtrate line, a filter cake wash liquid line, a reverse pressure gas line, and a reverse flow filter fabric washing fluid line connected to individual ports in said valve, means for applying a vacuum to the filtrate and filter cake wash liquid lines, means for mixing and introducing a solvent in the form of a mist suspended in gas to said reverse flow filter fabric washing fluid line, the entire arrangement being such that when the shaft is rotated, the conduits therein register with the ports in said valve so that the filter elements communicate successively with the vacuum filtrate line to produce filtration and deposition of solids on the filter elements, with the vacuum filter cake wash liquid line to draw a washing liquid through the filter cake, with the reverse pressure gas line to dislodge the cake, and finally with the reverse flow filter fabric washing fluid line after the filter cake has been removed to dissolve and remove slimy material from the pores of the filter fabric.

In witness whereof I have hereunto set my hand this 11th day of October, 1929.

FRANK W. HALL.